April 3, 1934.  J. A. BETTIN  1,953,388
TRUSS CHAIN
Filed Aug. 20, 1929  3 Sheets-Sheet 1
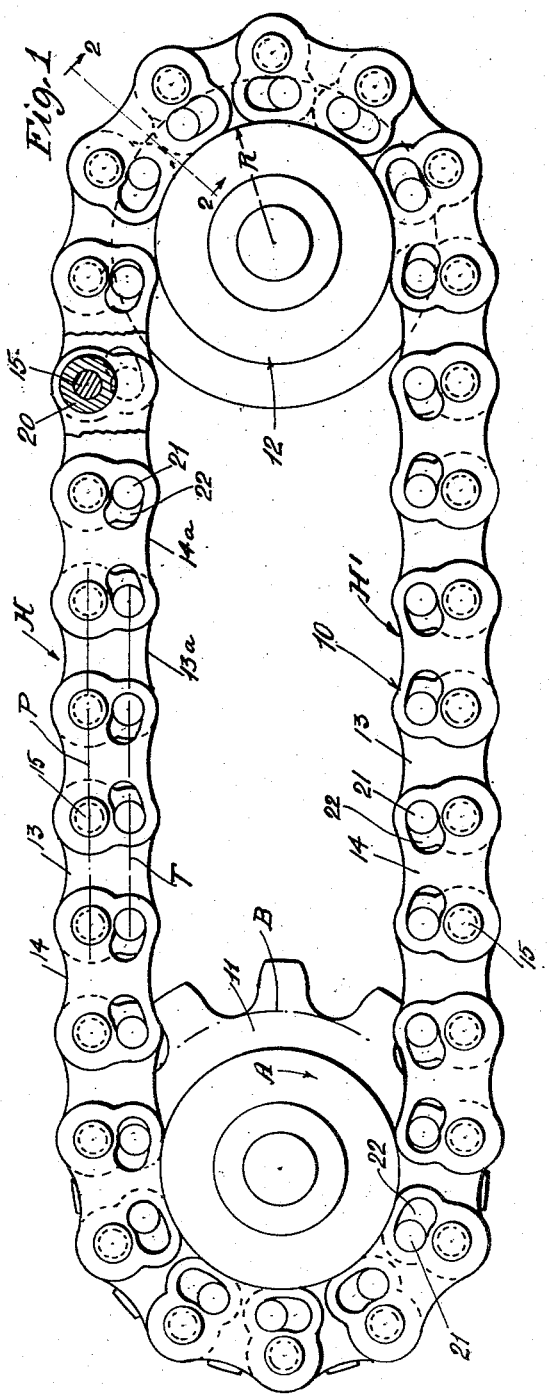
Inventor.
John A. Bettin
Attorney.

April 3, 1934.  J. A. BETTIN  1,953,388
TRUSS CHAIN
Filed Aug. 20, 1929   3 Sheets-Sheet 2
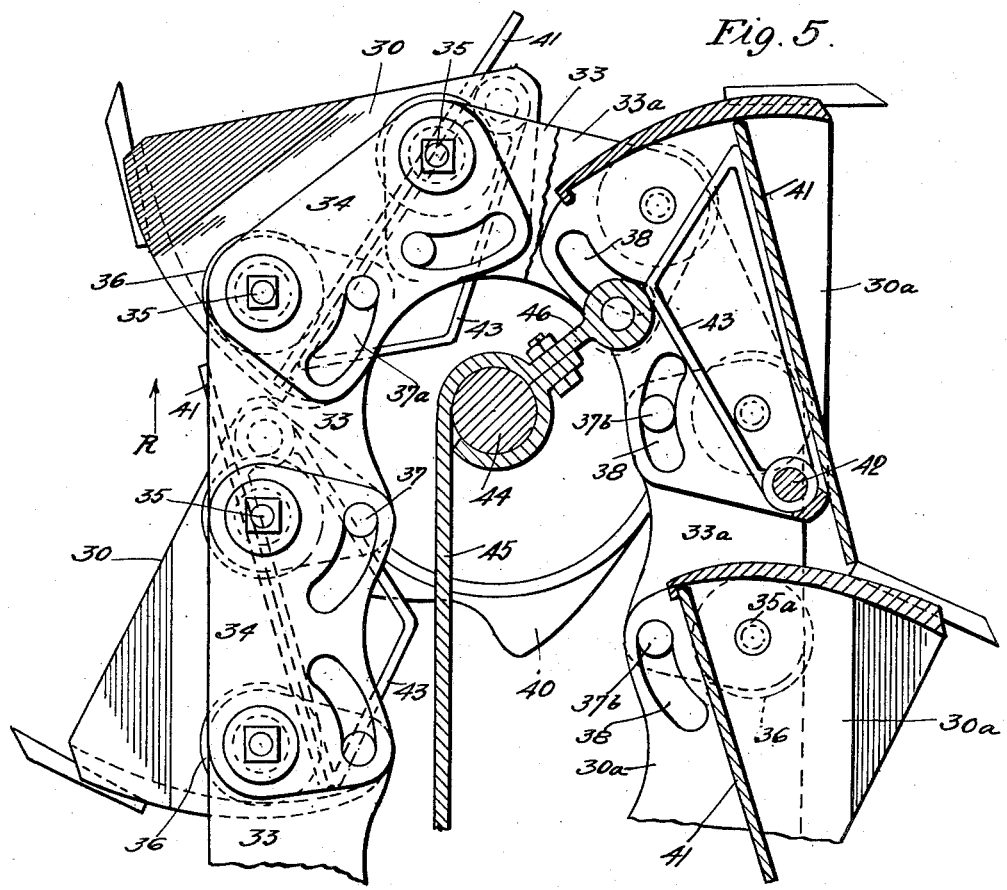
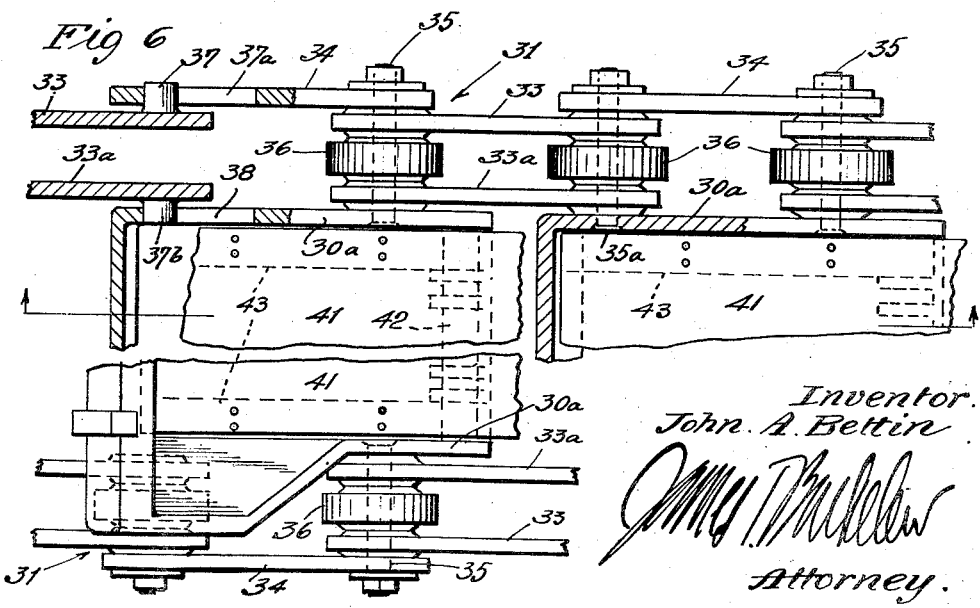
Inventor.
John A. Bettin
Attorney.

April 3, 1934. J. A. BETTIN 1,953,388
TRUSS CHAIN
Filed Aug. 20, 1929   3 Sheets-Sheet 3
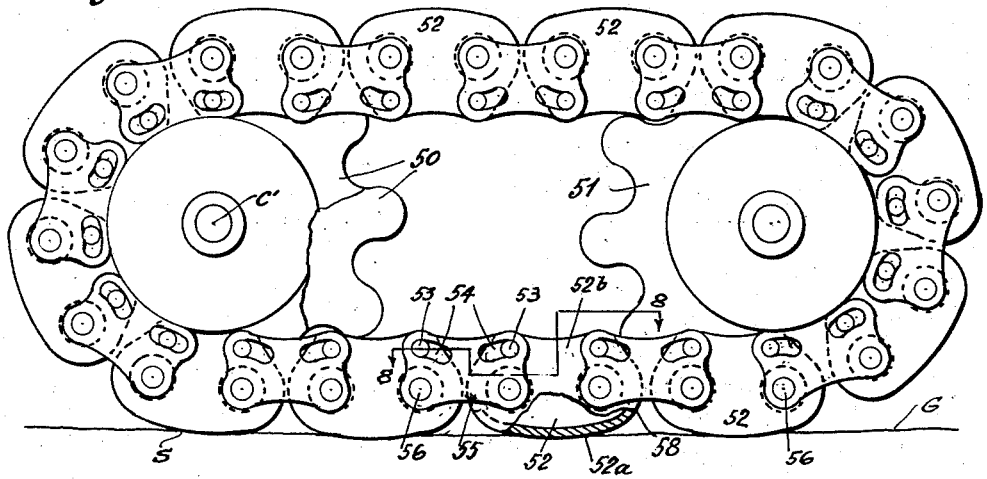
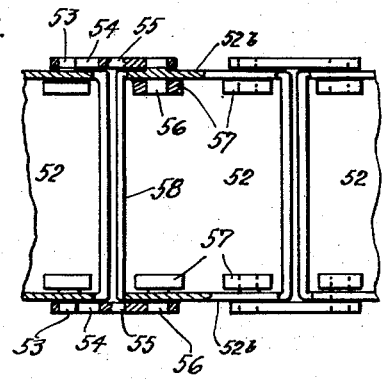
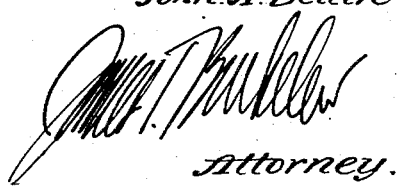
Inventor
John A. Bettin
Attorney.

Patented Apr. 3, 1934

1,953,388

UNITED STATES PATENT OFFICE 1,953,388

TRUSS CHAIN

John A. Bettin, Los Angeles, Calif.

Application August 20, 1929, Serial No. 387,228

4 Claims. (Cl. 74—31)

This invention has to do generally with link chains, link belts, conveyor lines and the like, and relates more particularly to a type of link construction having characteristics such as to enable the chain line to extend between horizontally spaced points without sagging, or to form, in effect, a truss between such points, and yet permit the chain to retain its normal flexibility in one direction to enable its application to a sprocket or guide.

In usual chain lines of the character mentioned, it is customary to pivotally interconnect adjacent elements or links to permit their relative turning in either direction about the pivots, and because of such pivotal connection, a chain extending over a considerable span sags appreciably unless there is sufficient tension in the chain to hold the links in alinement. In instances where the span is of unusual length it is impossible to tension the chain sufficiently to overcome the sag without undue wear and friction between the chain and sprocket, and without danger of rupturing the chain. Usually however, the chain is tensioned or directed in the desired course by means of an auxiliary guide or tensioning device.

The disadvantages inherent in chain drive mechanisms, and particularly in high speed drives, arising from play or the sagging tendency of the chain, are commonly known to result in excessive wear and strain on the chain elements, and deformation and destructive wear of the sprockets carrying the chain, there also being constant danger of breaking the chain because of the added burden and wear occasioned by its loose movement between sprockets. There is an additional tendency in certain types of chains wherein the adjacent links are interconnected by a single pivot, for the chain to stretch because of excessive strains imposed on the pins or on those portions of the links against which the pins bear. Upon even slight stretching of the chain, proper action between the chain and gear is prevented as there is a tendency for the chain rollers to climb the sprocket teeth and to improperly engage them, or to fail to engage the teeth so that the load is imposed on comparatively less than the proper number of teeth.

By the present invention I have provided a type of link construction whereby the relative turning between adjacent links is limited in one direction, and at a point at which the links are substantially in alinement, to the end that a chain constructed in accordance with the invention, may extend over a long span without sagging, due to the fact that the links retain their alined positions. Free pivotal movement between the links in an opposite direction is permitted, of course, to enable the chain to engage a sprocket in the usual manner. An additional advantage is gained by the present type of structure in that adjacent links are interconnected by a pair of pins, instead of a single pin pintle, tension stresses tending to pull the links apart thereby being carried by both pins with a resultant decrease in strain, in comparision with the usual types, both on the pins and links. This is done, generally speaking, by providing a projection on one of a pair of overlapping and pivotally connected links, and forming an opening in the other link to take said projection, the latter being adapted to engage the end of the opening when the links are longitudinally alined and to prevent their relative turning in one direction. By virtue of this arrangement, a twofold advantage is gained in that the relative movements of the link are limited to provide the truss effect described, and the connection between adjacent links is doubly strengthened by the use of a pair of connecting pins.

The present type of chain will be seen also to be of particular advantage in the construction of link conveyor lines, bucket lines, and the like, due to the inherent supporting characteristics of the link structure. Thus in conveyor lines commonly supported by a series of rollers, it may be desirable to construct the links in such lines in accordance with the invention and thereby do away with the necessity for additional supporting means, since the links are, in themselves, capable of forming a rigid line. Furthermore, although considerable load may be imposed on the conveyor line by carriers, buckets, etc., it is possible, by virtue of the present link construction, to give sufficient strength to the line to enable it to support the load.

The above and additional characteristics and advantages of the invention will be clearly understood from the following detailed description of typical embodiments thereof, reference being made throughout the description to the accompanying drawings, in which:

Fig. 1 is a side elevation of one form of chain embodying the invention, the chain being shown carried by horizontally spaced drive and guide sprockets to illustrate the truss effect;

Fig. 2 is a section through the guide sprocket on line 2—2 of Fig. 1;

Fig. 3 is a fragmentary plan view of the chain shown in Fig. 1, portions being broken away to show the projections and slots in adjacent link bars;

Fig. 4 is a view similar to Fig. 3, but showing a variational form of link;

Fig. 5 is a side elevation of another embodiment of the invention as applied to a truss link bucket line, a portion of said line being shown about a guide sprocket, and certain of the buckets being shown in medial section;

Fig. 6 is a plan view of the type of bucket line shown in Fig. 5, the buckets and their connecting truss links being in horizontally alined positions;

Fig. 7 is another embodiment of the invention as adapted to the construction of wheel track; and Fig. 8 is a section on broken line 8—8 of Fig. 7.

It will be noted that although I have shown several embodiments of the invention varying from a simple link chain to other forms in which the chain structure is incorporated in bucket lines and wheel tracks, the characteristic features of the interconnecting or link elements are substantially the same. And therefore it will be understood that the invention is broadly applicable to various devices of the general character hereinabove described and in which the interconnecting links or elements making up the chain may be, in some forms, simply overlapping link bars, and in other embodiments the conveyor buckets, track pads, may in themselves comprise parts of the links.

Referring first to Fig. 1, the continuous truss link chain 10 is shown extending around the drive sprocket 11 and around the pulley wheel 12, the body 12a of which carries a central annular guide flange 12b on its outer face. The individual links in the chain comprise the inner side bars 13 and outer side bars 14, the latter being pivotally connected to bars 13 by means of pins 15. The pivot pins extend snugly through openings 16 and 17 in the inner and outer link bars respectively, longitudinal movement of the pins being prevented by the enlarged heads 15a and retention pins 18. The usual rollers 20 are carried by the pivot pins for engagement with the sprockets. The inner side bars 13 each carry a pair of projections or lugs 21, and the outer side bars 14 are provided with arcuate slots 22 to take said lugs, the center of curvature of the slots being substantially at the center of pivots 15. It will be understood that any suitable shaped opening may be provided in the outer bars to take the inner bar projections, the opening serving primarily to provide a stop on the outer bars to limit the turning movement of the link bar carrying the projection. However, in order that the outer bars may be of maximum strength, it is preferable that the openings be in the form of the arcuate slots shown and which are but slightly wider than the diameter of the lug. The relative positions of the projections 21 and the arcuate slots preferably are such that when the links are in the horizontally alined positions indicated at H, the projections engage the ends of the slots to prevent further relative turning of the links about the pivots in a direction such as to cause the chain to sag. Although I have shown the projecting lugs to be formed on the inner link bars and the openings in the outer, the relative arrangement of these parts may be reversed should it be so desired. In the sense that the lugs serve in addition to projections for limiting relative turning between the links, also as stress taking connections between the links, these lugs may be regarded in such capacity as pins.

It will be noted that at the horizontal span H, the pintles 15 are substantially alined along the pitch line P, and lugs 21 are vertically below pins 15 and alined along what may be termed the truss line T. Substantially the same truss effect might be gained, of course, by varying the relative positions of the pins and lugs from those shown. That is, the lugs might be vertically offset relative to the pivot pins and the slots altered accordingly. However, it is preferred that the lugs, in the horizontal position of the chain indicated at H, lie substantially vertically below the pivot pin. In chain lines where there is occasion for dirt or gritty particles to be picked up, and such that would tend to cause the projecting lugs to wear, the relative positions of these lugs and the slots may be varied so that the chain may initially arch outwardly in order that as wear on the lugs takes place, the chain will gradually aline itself.

The effect had by the links turning about the sprocket or pulley is to cause the projections in adjacent links to move relatively together and about the pivots as centers, slots 22 having sufficient extent to accommodate the relative movement of the links. Upon rotation of the drive sprocket 11 in the direction of arrow A, pulley wheel 12 serving as a guide, the lower chain span H' will be tensioned and held substantially horizontal due to the pull of the drive sprocket. By tensioning the chain properly between the sprockets and pulley wheel, sag is substantially eliminated in both the upper and lower chain spans, and therefore regardless of the speed of rotation, the chains will at no time have a tendency to pay or whip laterally, assuming of course that the distance between sprockets are kept within reasonable limits.

In utilizing the pulley wheel as a chain guide, it will be noted that the link bars bear directly on the outer circular surface of the wheel body 12a, the chain rollers 20 clearing flange 12b on the wheel, and the flange serving merely as a guide for the chain in preventing its lateral movement off the wheel. In order to enable the links to bear directly against the pulley wheel body 12a and conform to the shape thereof, the lower or bearing surfaces 13a, 14a of the inner and outer side bars, respectively, are curved to fit the pulley wheels, the radius of curvature of the bearing faces of the bar being equal to the wheel radius R. Thus no wear takes place on the rollers of the chain in passing around the pulley chain, and the load and the chain is taken directly by the side bars due to their bearing on the wheel, rather than through the rollers and pivot pins.

It will be seen that the load on the chain, or the stress tending to pull adjacent links apart, is taken by both the pivot pins and the studs, this feature obviously strengthening the chain and preventing successive local strains in the various elements. Thus the tendency of the chain to stretch and the resultant disadvantages are reduced to a minimum, and although the connection between the adjacent links is doubly strengthened, the desired flexibility of the chain is unrestricted. The form of chain shown in Fig. 4 is generally similar to that described except that offset links 25 are substituted for the straight bar links 13 and 14. As in the previous type, adjacent link bars are pivotally connected by pins 26, and bosses 27 project from the inner offset portions 25a to register with slots 28 formed in the outer bar portions 25b.

It will be noted that although the present type of chain is specially constructed to give the truss effect described, additional strength under tensional stresses, the chain has no more working parts than ordinary types of roller chains. Since the projecting lugs which serve to carry the truss load are practically non-frictional in their bearing against the adjacent link bars, and therefore no appreciable wear is occasioned between these parts, which in effect, would tend to distend the chain or to cause it to sag below the pitch line. And since no appreciable wear takes place in the truss portion of the chain, the stress due to wear at the pivotal points of connection between adjacent links will give the chain a greater length at the pitch line while the length at the truss line remains the same. The effect had is that as the chain wears it will begin to arc outwardly, this arcing tending to compensate for the wear on the roller at the base diameter B of the sprocket, thereby eliminating the necessity for separate attachments to compensate for such wear. Thus under all conditions, irrespective of the amount of wear, it is impossible for the truss chain to travel below the pitch line.

In Fig. 5, wherein the present link structure is shown incorporated in the parts making up a bucket line, the buckets 30 are carried by chains generally indicated at 31 and attached to each side of the bucket. The chains 31 comprise the inner link bars 33 and 33a, outer bars 34, these being connected with the buckets through pins 35. These pins carry the usual rollers 36 between the inner links, said rollers being adapted to engage the axially alined and spaced sprockets 40 as shown in Fig. 5. The pivot pins are secured to the buckets in any suitable manner, for instance heads 35a being countersunk in sides 30a of the buckets. The bars 33 carry the lugs 37, the latter projecting within slots 37a formed in the outer links 34. The sides 30a of the bucket are also provided with slots 38 adapted to take lugs 37b formed on the inner link bars 33a. It will be apparent that the sides 30a of the buckets, considered as elements of the chains, are similar to links 34 as regards their connections and associations with the inner link bars 33 and 33a. Furthermore, in comparison with the chain shown in Fig. 1, it will be noticed that bars 34 and the bucket sides 30a correspond to the outer link bars 14, the inner bars 33 and 33a being similar to the inner bars in the previously described chain.

In Fig. 5 the bucket line is shown extending around the sprockets 40, the latter being the guide or drive means for the bucket line. The buckets are provided with the swinging bottomed or cleaning plates 41 pivotally mounted on rods 42 extending horizontally between the bucket sides. Secured to the under sides of the cleaning plates are kick-out lugs 43, the latter also being pivotally mounted on rods 42 and adapted to move integrally with the plates. The sprocket shaft 44 is pivotally mounted on a suitable support 45, the latter carrying a projecting arm or kick-out cam 46 adapted to engage lugs 43 to actuate the cleaning plate for discharging material from the bucket. Thus, assuming that the bucket line moves in the direction of arrow R, and that the upward moving buckets are filled with material, it will be noted that when the buckets pass the vertical center of the sprocket, cam 46 engages the kick-out lugs 43 causing plates 41 to move outward through the buckets as the latter start their downward travel, thus discharging the contents of the buckets. In certain instances it may be desirable to substitute conveyor pans for the buckets and to have the conveyor line extend between the horizontally spaced sprockets or guides. Assuming that the span between sprockets is kept within reasonable limits, it would be unnecessary to provide intermediate supporting means for the conveyor lines, since by virtue of the chain structure, it is inherently capable of supporting the loaded containers without sagging. Dredge or bucket line constructed in accordance with the invention are particularly satisfactory, due to the rigidity given the line by the truss link structure, such rigidity assuring a constant path of travel for the parts and thereby preventing one bucket or scoop from cutting below the others. And since this is the case, the construction of such lines is simplified generally since the usual auxiliary guide and control parts are dispensed with.

In Fig. 7 another embodiment of the invention is shown wherein treads are substituted for the inner link bars to provide a truss wheel track line. In this embodiment, sprockets 50 and 51 are adapted to serve as wheels on a tractor or similar machine, the purpose of the tread chain being to progressively form a track for the wheels. The inner link elements, comprising the cup shaped treads 52, have the curved bottom portions 52a and vertical sides 52b, the sides carrying the projecting lugs 53 which extend within the arcuate slots 54 formed in the outer side bars 55. On the inner side of the cup treads are the equally spaced lugs 56 carrying rollers 57 which are adapted to engage the sprockets. The ends of the treads are cut away at 58 to enable the sprockets to engage the rollers and to allow the treads to clear the sprockets. Because of the width of the tread desired, it is preferable that the tracks be carried by a pair of axially alined and spaced sprockets adapted to engage the laterally spaced rollers, instead of extending studs 56 and rollers 57 across the treads and employing single sprockets. As previously mentioned, the track is laid on the ground G as the wheels progress, and it will be seen that should ground irregularities be encountered the track remains rigid in forming a truss to resist upward curving, thus doing away with the necessity for providing supporting or bearing rollers between sprockets. Similarly, the upper span remains rigid against downward sag. The pads 52 are shaped so that their longitudinal curvature or arc S has its center at the center C' of the sprocket, this permitting the track to be laid with as little ground resistance as would be encountered by a circular wheel. As in the case of dredge and conveyor lines, construction of rigid wheel tracks in accordance with the invention is greatly simplified and the working parts reduced in comparison with the usual types employed.

It will be understood the drawings and description are to be considered merely as illustrative of and not restrictive on the broader claims appended hereto, for various changes in design, structure and arrangement may be made without departing from the spirit and scope of said claims.

I claim:

1. In a chain structure, a plurality of pivotally connected link members, pins interconnecting said members and forming fixed pivot points between adjacent members, and a plurality of projections, each carried on a link member and adapted to engage an adjacent member to limit relative turning movement between the members in their normal positions, each of said projections in the normal positions of the members, being offset from the common center line of said pins and lying in planes extending through said pins at substantially right angles with the common center line of the pins.

2. In a chain structure, a plurality of pivotally connected link members, pins interconnecting said members and forming fixed pivot points between adjacent members, and a plurality of projections, each carried on a link member and extending within an arcuate slot in an adjacent link member, said projections being adapted to engage the ends of the slots to limit relative turning movement between the members in their normal positions, said projections in said normal positions of the members, being offset from the common center line of the pins.

3. In a chain structure, a plurality of pivotally connected link members, pins interconnecting said members and forming fixed pivot points between adjacent members, and a plurality of projections, each carried on a link member and extending within an arcuate slot in an adjacent link member, said projections being adapted to engage the ends of the slots to limit relative turning movement between the members in their normal positions, each of said projections in the normal positions of the members, being offset from the common center line of said pins and lying in planes extending through said pins at substantially right angles with the common center line of the pins.

4. In a chain structure, a vertical link bar adapted to overlap the ends of adjacent chain members, a pair of pivot pins interconnecting said members and the link bar, said members being pivotally movable about relatively fixed points with reference to the link bar, a pair of projections, one on each of the members substantially directly below said pivot pins, and a pair of slots in said bar to take said projections, relative turning movement between said members being limited in one direction when said members are longitudinally alined by the engagement of said projections with the link bar at the ends of the slots.

JOHN A. BETTIN.